US011366994B2

(12) United States Patent
Oda et al.

(10) Patent No.: US 11,366,994 B2
(45) Date of Patent: Jun. 21, 2022

(54) METHOD OF MANUFACTURING METAL PRODUCT AND METAL PRODUCT

(71) Applicant: Mitsui High-tec, Inc., Kitakyushu (JP)

(72) Inventors: Jin Oda, Kitakyushu (JP); Junya Satake, Kitakyushu (JP); Tomoki Hirayama, Kitakyushu (JP)

(*) Notice: Subject to any disclaimer, the term of this patent is extended or adjusted under 35 U.S.C. 154(b) by 205 days.

(21) Appl. No.: 16/597,857

(22) Filed: Oct. 10, 2019

(65) Prior Publication Data

US 2020/0042848 A1 Feb. 6, 2020

Related U.S. Application Data

(63) Continuation of application No. PCT/JP2018/004071, filed on Feb. 6, 2018.

(30) Foreign Application Priority Data

Apr. 14, 2017 (JP) .............................. JP2017-080582

(51) Int. Cl.
*G06K 19/06* (2006.01)
*B23K 26/082* (2014.01)
(Continued)

(52) U.S. Cl.
CPC ...... *G06K 19/06037* (2013.01); *B23K 26/082* (2015.10); *B23K 26/362* (2013.01); *G06K 7/1417* (2013.01); *H02K 15/02* (2013.01)

(58) Field of Classification Search
CPC ...... B23K 26/082; B23K 26/362; B41M 5/24; B41M 5/262; G06K 1/128;
(Continued)

(56) References Cited

U.S. PATENT DOCUMENTS 5,965,042 A 10/1999 Saitoh
6,681,055 B1 * 1/2004 Sato ....................... G06K 1/121
382/275
(Continued)

FOREIGN PATENT DOCUMENTS

CN 105855706 8/2016
EP 2692474 2/2014
(Continued)

OTHER PUBLICATIONS

Extended Search Report in corresponding European Application No. 18783821.4, dated Feb. 5, 2021.
(Continued)

*Primary Examiner* — Dana Ross
*Assistant Examiner* — Joseph W Iskra
(74) *Attorney, Agent, or Firm* — Soei Patent & Law Firm

(57) ABSTRACT

A method of manufacturing a metal product comprise forming a base region on a surface of a metal member by repeatedly scanning along a predetermined first direction while irradiating the surface of the metal member with a base laser beam over a first set of rows. The method further comprises forming a marking by repeatedly scanning along a predetermined second direction while irradiating the surface of the metal member with a marking laser beam over a second set of rows. The second direction is different from the first direction. An identification code having a predetermined pattern comprises a combination of the base region and the marking.

10 Claims, 16 Drawing Sheets

(51) Int. Cl.
*B23K 26/362* (2014.01)
*G06K 7/14* (2006.01)
*H02K 15/02* (2006.01)

(58) Field of Classification Search
CPC ....... G06K 19/06037; G06K 19/06121; G06K 19/06159; G06K 7/1417; H02K 15/02
USPC .................................................. 219/121.69
See application file for complete search history.

(56) References Cited

U.S. PATENT DOCUMENTS

| | | | |
|---|---|---|---|
| 2005/0218125 | A1 | 10/2005 | Addington et al. |
| 2007/0038464 | A1* | 2/2007 | Sato ................... G05B 19/4183 358/1.17 |
| 2010/0039916 | A1 | 2/2010 | Hasegawa et al. |
| 2014/0015170 | A1 | 1/2014 | Reichenbach et al. |
| 2014/0027412 | A1 | 1/2014 | Kato et al. |
| 2018/0045232 | A1 | 2/2018 | Capostagno et al. |

FOREIGN PATENT DOCUMENTS

| | | |
|---|---|---|
| JP | H8-150486 | 6/1996 |
| JP | H10-034359 | 2/1998 |
| JP | 2000-222516 | 8/2000 |
| JP | 2002-205178 | 7/2002 |
| JP | 2005-063143 | 3/2005 |
| JP | 2006-255718 | 9/2006 |
| JP | 2008-012567 | 1/2008 |
| JP | 2009-062623 | 3/2009 |
| JP | 2009-513362 | 4/2009 |
| JP | 4575812 | 11/2010 |
| JP | 2011-136347 | 7/2011 |
| JP | 2011-212728 | 10/2011 |
| JP | 2012-148308 | 8/2012 |
| JP | 5397070 | 1/2014 |
| WO | 2007/049064 | 5/2007 |
| WO | 2012/132653 | 10/2012 |

OTHER PUBLICATIONS

International Search Report dated Apr. 3, 2018 for PCT/JP2018/004071.
International Preliminary Report on Patentability with Written Opinion dated Oct. 24, 2019 for PCT/JP2018/004071.

\* cited by examiner

METHOD OF MANUFACTURING METAL PRODUCT AND METAL PRODUCT

CROSS-REFERENCE TO RELATED APPLICATIONS

This application is a continuation application of PCT Application No. PCT/JP2018/004071 filed on Feb. 6, 2018, which claims the benefit of priority from Japanese Patent Application No. 2017-080582, filed on Apr. 14, 2017, the entire contents of which are incorporated herein by reference.

FIELD

The present disclosure relates to a method of manufacturing a metal product and a metal product.

BACKGROUND

Japanese Unexamined Patent Publication No. 2000-222516 discloses a method of producing a metal product by forming a two-dimensional code on a surface of a metal member. The method includes forming a black marking having a predetermined pattern by repeating the process of irradiating a surface of a metal member with a laser beam to oxidize metal and printing circular dots on the surface, the dots corresponding to the beam shape. A two-dimensional code formed with a combination of a black cell that is a group of circular dots and a white cell that is a region not irradiated with the laser beam is thus formed on the surface of the metal member. The two-dimensional code has the function as an identification code that identifies each individual metal product (for example, product type, production date, materials used, and production line).

SUMMARY

An example method of manufacturing a metal product may comprise forming a base region on a surface of a metal member by repeatedly scanning along a predetermined first direction while irradiating the surface of the metal member with a base laser beam over a first set of rows. The method may further comprise forming a black marking having a predetermined pattern that is formed by oxidizing the surface of the metal member, by repeatedly scanning along a predetermined second direction while irradiating the surface of the metal member with a marking laser beam over a second set of rows. Further, the second direction may be different from the first direction. Still further, an identification code having a predetermined pattern may comprise a combination of the base region and the marking.

Another example method of manufacturing a metal product may comprise forming a marking by repeatedly scanning along a predetermined first direction while irradiating a surface of a metal member with a marking laser beam over a first set of rows, the marking laser beam generated by a pulse-like laser light source. The marking laser beam may be scanned at a feed pitch equal to or smaller than a spot diameter in the first direction and at a predetermined arrangement pitch in a row direction. Further, the marking may comprise a combination of cells each having a square shape. Still further, forming the marking may include irradiating each of the cells with the marking laser beam such that Expression 1 is satisfied:

$$b \times n / a \geq 0.5 \quad (1)$$

where parameters a, b, and n are defined as:
- a: a length of one side of each cell;
- b: a pulse diameter of the marking laser beam; and
- n: a number of scans of the marking laser beam per cell.

An example metal product may comprise an identification code having a predetermined pattern comprising a combination of a base region and a marking formed on a surface of a metal member. The base region may comprise multiple rows of laser grooves extending along a predetermined first direction. Further, the marking may comprise multiple rows of laser grooves extending along a predetermined second direction different from the first direction.

DETAILED DESCRIPTION

In the following description, with reference to the drawings, the same reference numbers are assigned to the same components or to similar components having the same function, and overlapping description is omitted.

Structure of Stacked Rotor Core

Figure 1:
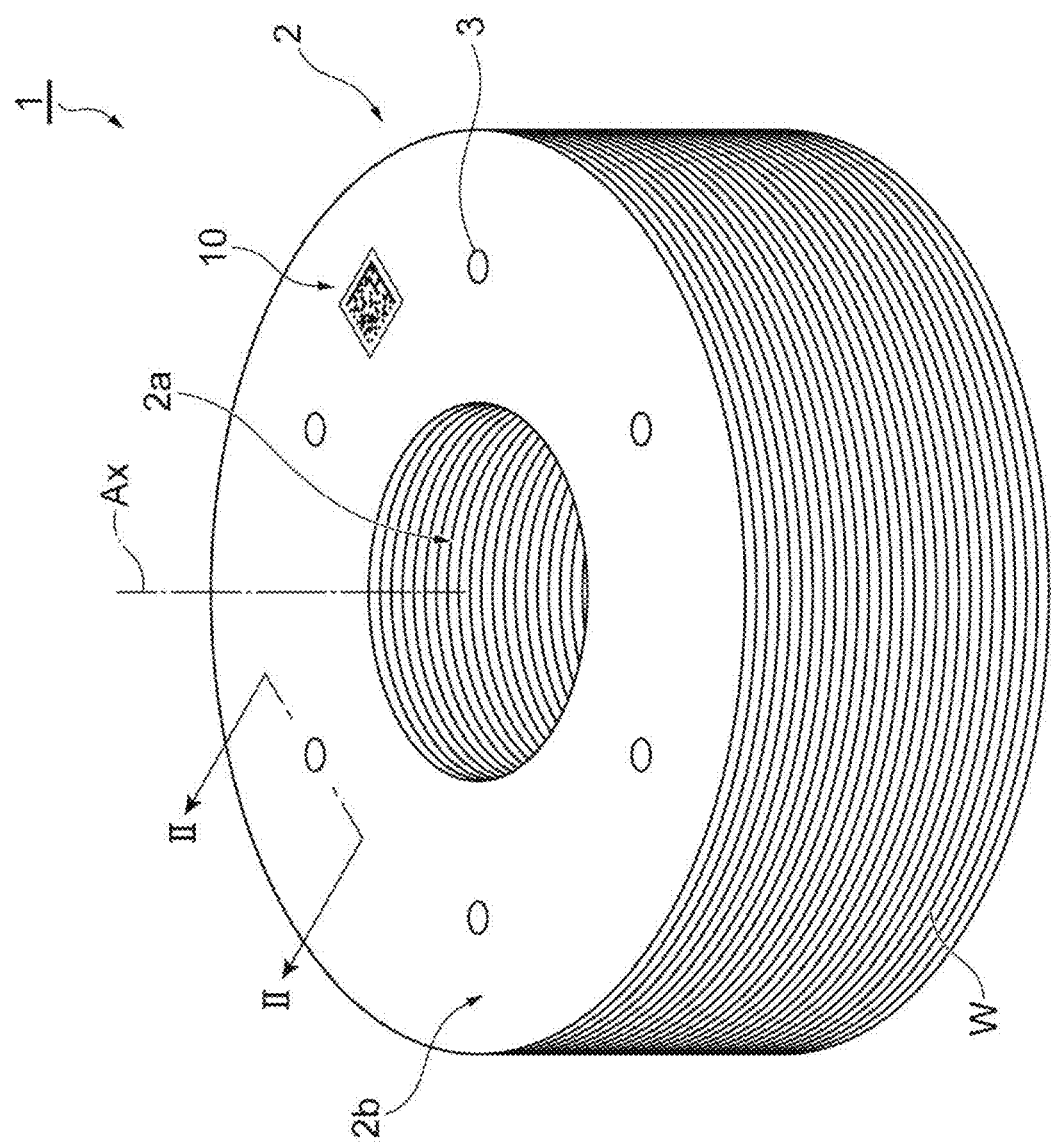
FIG. 1 is a perspective view illustrating an example stacked rotor core.
Figure 2:
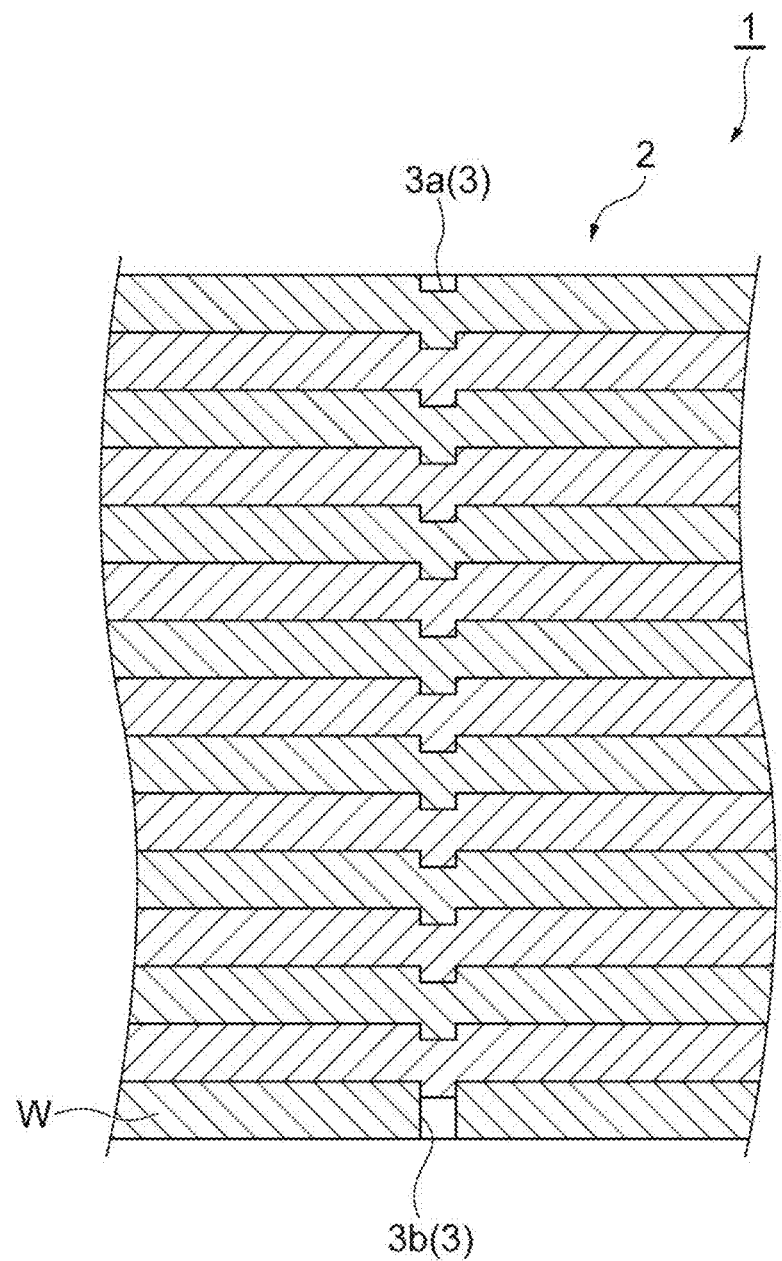
FIG. 2 is a cross-sectional view along line in FIG. 1.

First of all, referring to FIG. 1 and FIG. 2, a structure of a stacked rotor core 1, which is an example of the metal product, is described. The stacked rotor core 1 is a part of a rotor. The rotor is formed by attaching end plates and a shaft (which are not illustrated) to the stacked rotor core 1. As illustrated in FIG. 1, the stacked rotor core 1 includes a stack 2 (metal member), connecting tab portions 3, and an identification code 10.

The stack 2 has a cylindrical shape. As illustrated in FIG. 1, a through hole 2a (center hole) extending along the center axis Ax is provided at the center portion of the stack 2. A shaft may be disposed in the through hole 2a.

The stack 2 is a stack 2 in which a plurality of blanked members W are stacked. The blanked member W is a plate formed by blanking an electrical steel sheet (metal plate) into a predetermined shape. Since the electrical steel sheet is obtained by rolling by using rolls, the surface of the blanked member W may have rolling marks. The stack 2 may be formed by stacking a plurality of blanked members W while shifting the angles of the blanked members W from each other, which is called rotational stacking. The angle of rotational stacking may be set to a desired value.

The blanked members W adjacent in the stacking direction are fastened to each other by the connecting tab portions 3. As illustrated in FIG. 2, the connecting tab portions 3 include a connecting tab 3a formed at a blanked member W forming a layer other than the bottom layer of the stack 2 and a through hole 3b formed at a blanked member W forming the bottom layer of the stack 2. The connecting tab 3a has a depression formed on the front surface side of a blanked member W and a projection formed on the back surface side of the blanked member W. The depression of the connecting tab 3a of one blanked member W is joined to the projection of the connecting tab 3a of another blanked member W adjacent to the front surface side of the one blanked member W. The projection of the connecting tab 3a of one blanked member W is joined to the depression of the connecting tab 3a of still another blanked member W adjacent to the back surface side of the one blanked member W. The projection of the connecting tab 3a of the blanked member W adjacent to the bottom layer of the stack 2 is joined to the through hole 3b. The through hole 3b is configured to prevent the blanked member W subsequently formed from being fastened to the previously produced stack 2 by the connecting tab 3a when stacks 2 are continuously produced.

A plurality of blanked members W may be fastened to each other by a variety of known methods, instead of the connecting tab portions 3. A plurality of blanked members W may be joined to each other, for example, by adhesive or a resin material or joined to each other by welding. The blanked member W may be provided with a temporarily-connecting tab, and the stack 2 may be obtained by fastening a plurality of blanked members W to each other through temporarily-connecting tabs to form a stack, and thereafter removing the temporarily connecting tabs from the stack. The "temporarily-connecting tab" means a connecting tab used for temporarily integrating a plurality of blanked members W and removed in the process of producing a product (stack 2).

At least one magnet insertion hole (not illustrated) extending along the extending direction (stacking direction) of the center axis Ax and passing through the stack 2 may be provided in the stack 2. The magnet insertion hole may be filled with a resin material with a permanent magnet (not illustrated) disposed therein. The resin material may be configured to fix a permanent magnet in the magnet insertion hole and to join the blanked members W adjacent in the height direction of the stack 2 together.

Detail of Identification Code

As illustrated in FIG. 1, one identification code 10 is provided on a surface 2b (upper surface or lower surface) of the stack 2, that is, the outer surface of the blanked member W forming the top layer or the bottom layer of the stack 2. The identification code 10 is configured to hold individual information (for example, product type, production date, materials used, and production line) for identifying each individual stacked rotor core 1 having the identification code 10. The identification code 10 may be anything that can hold the individual information with a combination of light pattern and dark pattern. The identification code 10 may be a barcode or a two-dimensional code, for example. Examples of the two-dimensional code include QR code (registered trademark), DataMatrix, and Vericode. As illustrated in detail in FIG. 3, the identification code 10 includes a base region 12 and a black marking 14. The identification code 10 has a predetermined pattern with a combination of the base region 12 and the black marking 14.

Figure 3:
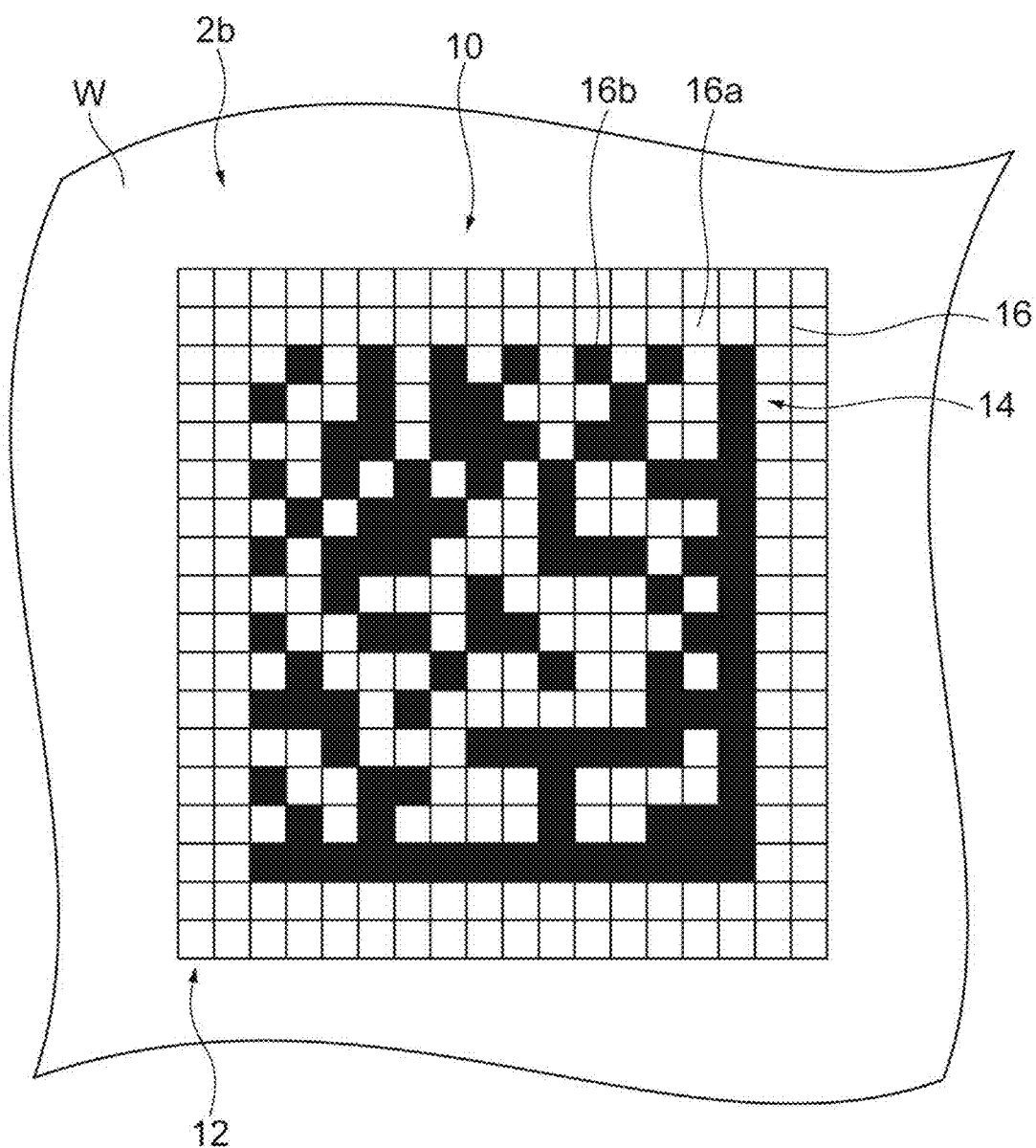
FIG. 3 is a top view illustrating an example identification code provided on the stacked rotor core.

As illustrated in FIG. 3, the identification code 10 has a plurality of virtual cells 16. A plurality of cells 16 are arranged in a grid pattern and correspond to the size of the identification code 10 as a whole. Although lines in a grid pattern that define the cells 16 are illustrated in FIG. 3, these lines are drawn for the sake of convenience to facilitate understanding of the identification code 10 and do not exist in the actual identification code 10. The size of the cell 16 is not limited and may be a variety of sizes depending on the required performance of the identification code 10. The shape of the cell 16 is not limited and may be, for example, square, rectangular, circular, polygonal, and any other undefined shapes. The cell 16 may be set to, for example, a 0.15 mm by 0.15 mm square shape or a 0.285 mm by 0.285 mm square shape. In the present description, a cell 16 in which the base region 12 is formed is called white cell 16a, and a cell 16 in which the black marking 14 is formed is called black cell 16b.

The base region 12 is formed by irradiating the surface 2b of the stack 2 with a base laser beam. The size of the base region 12 is not limited and may be a variety of sizes depending on the size of the stack 2, the kind of material of the blanked member W, the position of the identification code 10 formed, and the like. The shape of the base region 12 is not limited and may be, for example, square, rectangular, circular, polygonal, and any other undefined shapes. The base region 12 may be set to, for example, a 5 mm by 5 mm square shape.

Examples of the base laser beam for forming the base region 12 include YAG laser, $YVO_4$ laser, and fiber laser. The base laser beam may be continuous wave (CW) laser or may be pulsed laser. The beam diameter (the diameter of light ray before the beam reaches a radiation target), the spot diameter (the diameter of light ray on the surface of a radiation target when the base laser beam radiates the radiation target), and the output level of the base laser beam are not limited and may be in various sizes depending on the kind of beam, the kind of material of the blanked member W, the thickness of the blanked member W, and the like. Even with the same beam diameter, the spot diameter may vary because the melting state by the beam varies depending on the kind of material of the radiation target irradiated with the base laser beam.

Figure 4:
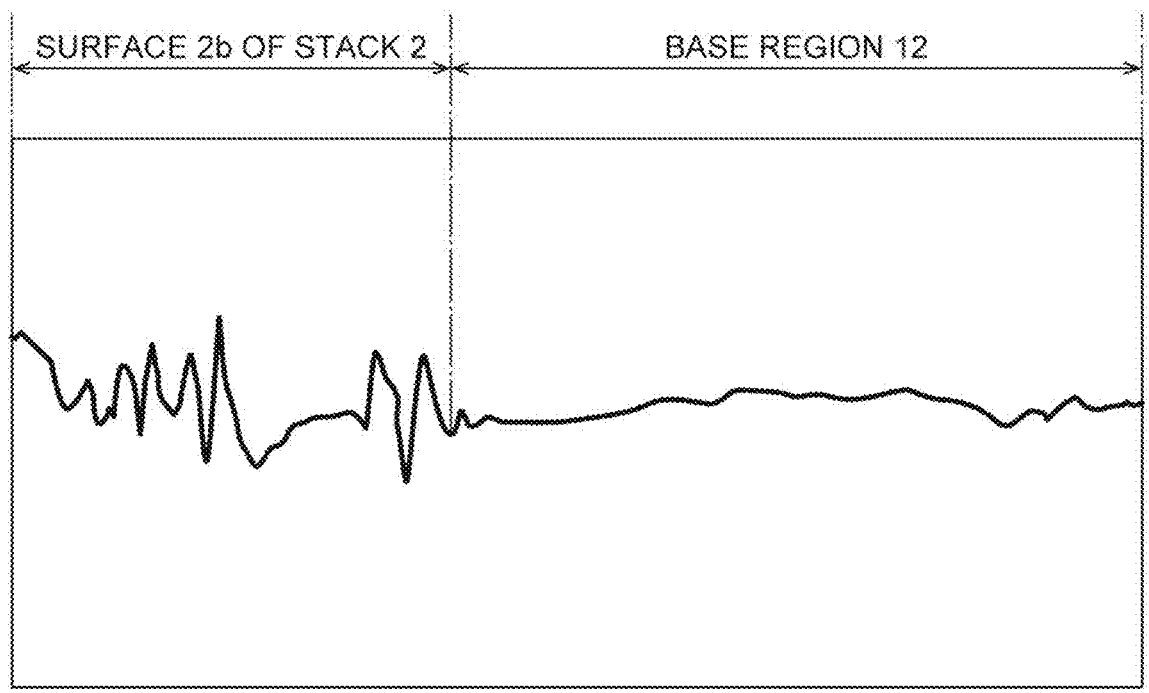
FIG. 4 is a diagram illustrating an example surface profile of a stack (blanked member).

Since the surface 2b of the stack 2 (blanked member W) is treated by the base laser beam, as illustrated in FIG. 4, the base region 12 has an extremely high flatness. For example, as illustrated in FIG. 4, the surface of the blanked member W with rolling marks have protrusions and depressions with a height of approximately a few μm to a few tens of μm, whereas the height of protrusions and depressions present on the surface of the base region 12 is approximately 1 μm or less.

Figure 5:
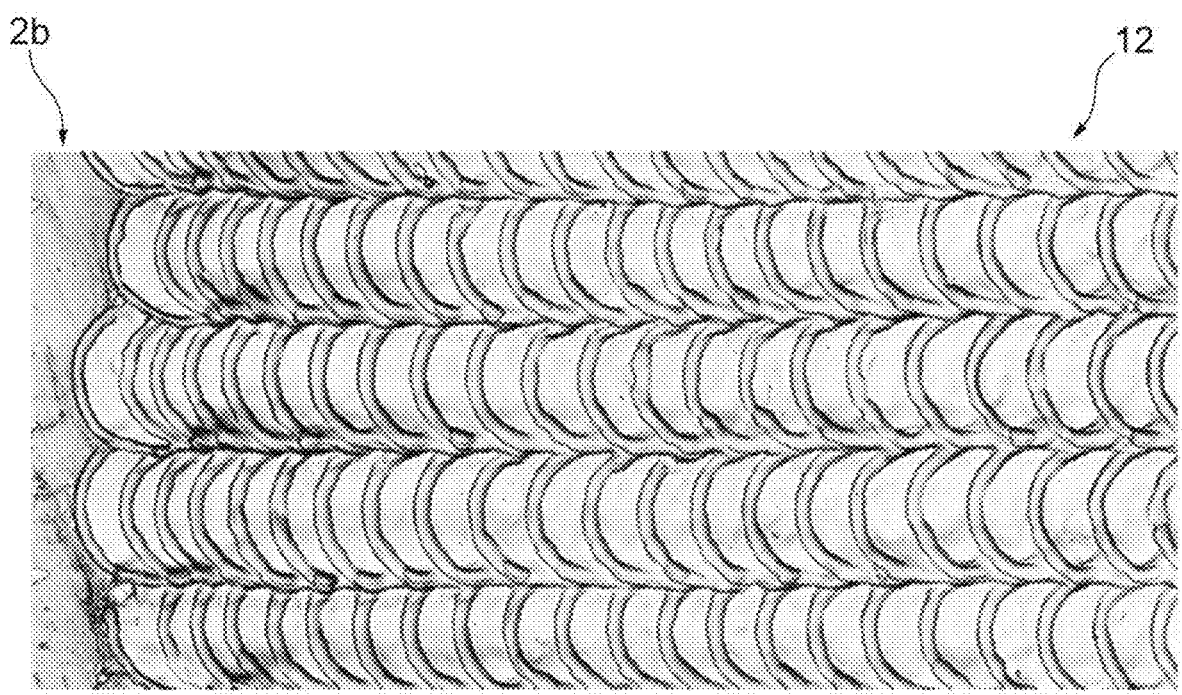
FIG. 5 is a photograph of a partially enlarged view of a base region.

The base region 12 is formed by repeatedly scanning along a predetermined direction A (see FIG. 8A) while irradiating the surface of the stack 2 (blanked member W) with the base laser beam over multiple rows. That is, as illustrated in FIG. 5, the base region 12 is configured such that laser grooves extending along the direction A (scan direction) are arranged in multiple rows. FIG. 5 illustrates a state of laser grooves when pulsed laser is used as the base laser beam, as an example. One laser groove in FIG. 5 is formed with a plurality of pulse marks (the marks produced when the surface of the blanked member W is irradiated with the pulsed laser beam for base) continuous from the left side to the right side in FIG. 5. That is, the laser groove in FIG. 5 is formed by scanning from the left side to the right side in FIG. 5 by the base laser beam.

In the row direction that is the direction in which the scan rows of the base laser beam are arranged (the direction in which the laser grooves are arranged), the arrangement pitch of the base laser beam (the arrangement pitch of laser grooves) may be equal to or smaller than the spot diameter of the base laser beam. That is, the laser grooves adjacent in the row direction at least partially overlap each other. When the base laser beam is pulsed laser, the pulse marks may be arranged at a feed pitch equal to or smaller than the spot diameter in the scan direction of the base laser beam.

The black marking 14 is formed by irradiating the base region 12 with a marking laser beam. The black marking 14 is the blanked member W oxidized by the marking laser beam and becoming black. The black marking 14 has a predetermined pattern and forms the identification code 10 together with the surrounding base region 12. As illustrated in FIG. 3, the black marking 14 is a group of black cells 16b formed by irradiating the cells 16 with the marking laser beam and filling the cells 16 with black color.

Examples of the marking laser beam for forming the black marking 14 include YAG laser, $YVO_4$ laser, and fiber laser. The marking laser beam may be continuous wave laser or may be pulsed laser. The beam diameter (the diameter of light ray before the beam reaches a radiation target), the spot diameter (the diameter of light ray on the surface of a radiation target when the marking laser beam radiates the radiation target), and the output level of the marking laser beam are not limited and may be in various sizes depending on the kind of beam, the kind of material of the blanked member W, the thickness of the blanked member W, and the like. However, the output level of the marking laser beam may be greater than the output level of the base laser beam, for example, may be 10 times or more as large as the output level of the base laser beam. Even with the same beam diameter, the spot diameter may vary because the melting state by the beam varies depending on the kind of material of the radiation target irradiated with the marking laser beam.

The black cell 16b is formed by repeatedly scanning along a predetermined direction B (see FIG. 8B) while irradiating the base region 12 with the marking laser beam over multiple rows. That is, as illustrated in FIG. 6A, FIG. 6B, FIG. 6C and FIG. 7, the base region 12 is configured such that laser grooves extending along the direction B (scan direction) are arranged in multiple rows. FIG. 6A, FIG. 6B, FIG. 6C and FIG. 7 both illustrate a state of laser grooves when pulsed laser is used as the marking laser beam, as an example. One laser groove in FIG. 6A, FIG. 6B, FIG. 6C and FIG. 7 is formed with a plurality of pulse marks (the marks produced when the surface of the base region 12 is irradiated with the pulsed marking laser beam) continuous from the upper side to the lower side in FIG. 6A, FIG. 6B, FIG. 6C and FIG. 7. That is, the laser groove in FIG. 6A, FIG. 6B, FIG. 6C and FIG. 7 is formed by scanning from the upper side to the lower side in FIG. 6A, FIG. 6B, FIG. 6C and FIG. 7 by the marking laser beam.

Figure 6A:
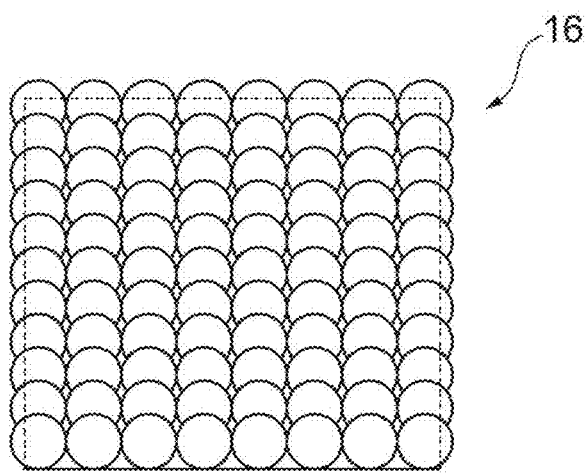
FIG. 6A is a diagram illustrating an example black cell.
Figure 6B:
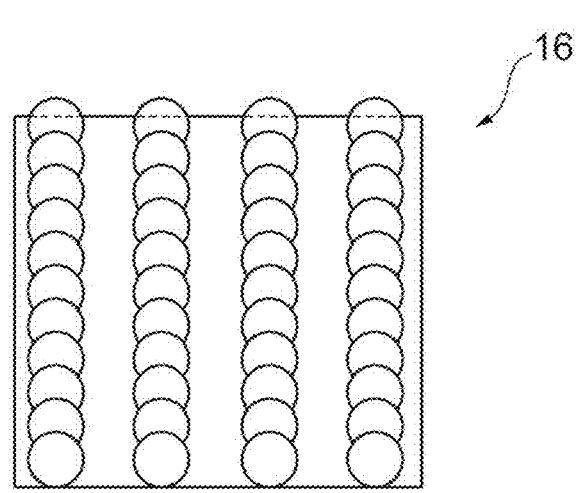
FIG. 6B is a diagram illustrating another example black cell.
Figure 6C:
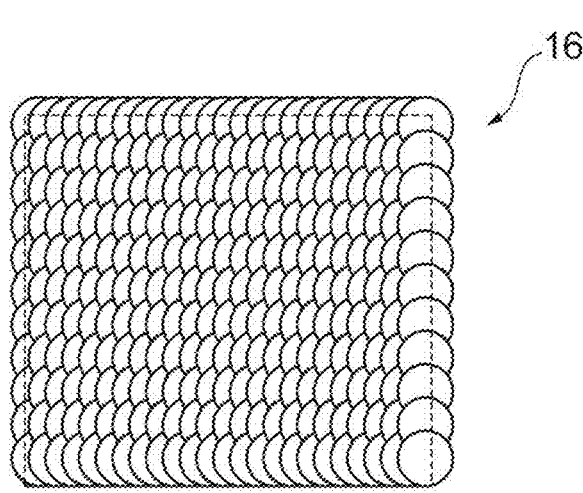
FIG. 6C is a diagram illustrating another example black cell.
Figure 7:
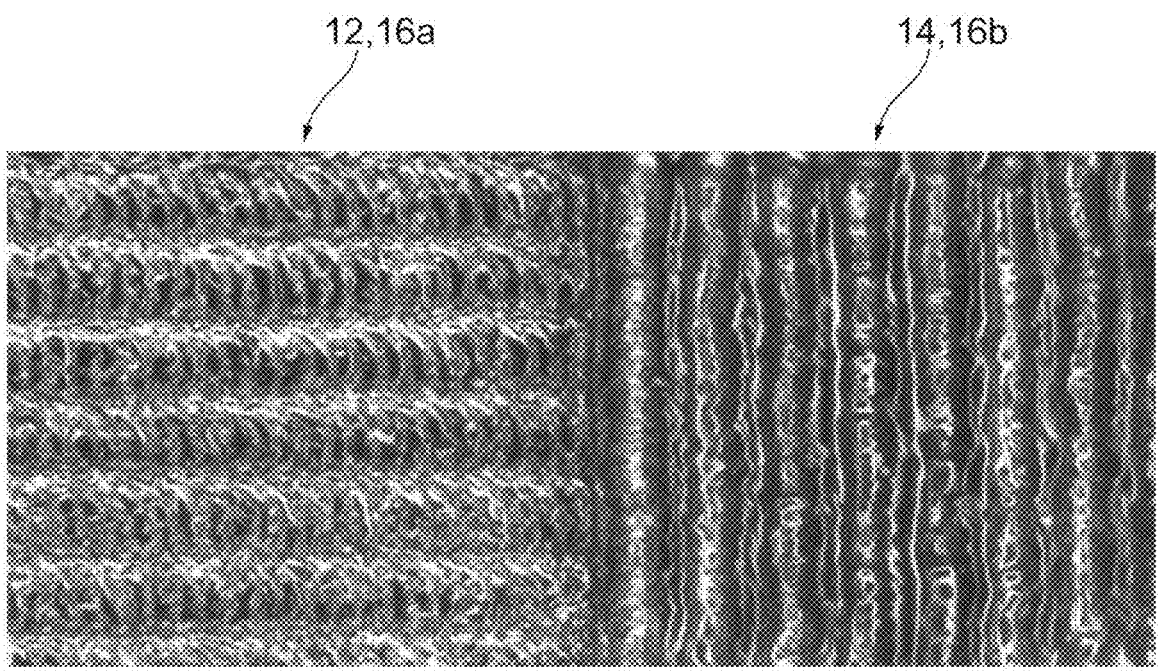
FIG. 7 is a photograph of a partially enlarged view of the vicinity of the boundary between a black marking and a base region.

In the row direction that is the direction in which the scan rows of the marking laser beam are arranged (the direction in which the laser grooves are arranged), the arrangement pitch of the marking laser beam (the arrangement pitch of laser grooves) may be set to a predetermined interval. For example, the arrangement pitch may be approximately equal to the spot diameter of the marking laser beam as illustrated in FIG. 6A, may be larger than the spot diameter of the marking laser beam as illustrated in FIG. 6B, or may be smaller than the spot diameter of the marking laser beam as illustrated in FIG. 6C. That is, the laser grooves adjacent to each other in the row direction may adjoin to each other (see FIG. 6A), may be spaced apart from each other (see FIG. 6B), or may at least partially overlap each other (see FIG. 6C). When the marking laser beam is pulsed laser, the pulse marks may be arranged at a feed pitch equal to or smaller than the spot diameter in the scan direction of the marking laser beam.

The scan direction of the marking laser beam may be different from the scan direction of the base laser beam. That is, the scan direction of the marking laser beam may be opposite to or may intersect the scan direction of the base laser beam. In the example illustrated in FIG. 7, the scan direction of the marking laser beam is orthogonal to the scan direction of the base laser beam.

Method of Forming Identification Code

A method of forming the identification code 10 on the stack 2, that is, a method of manufacturing the stacked rotor core 1 will now be described. First of all, the stack 2 is formed by blanking and stacking blanked members W from an electrical steel sheet (workpiece plate) which is a strip-like metal plate.

Figure 8A:
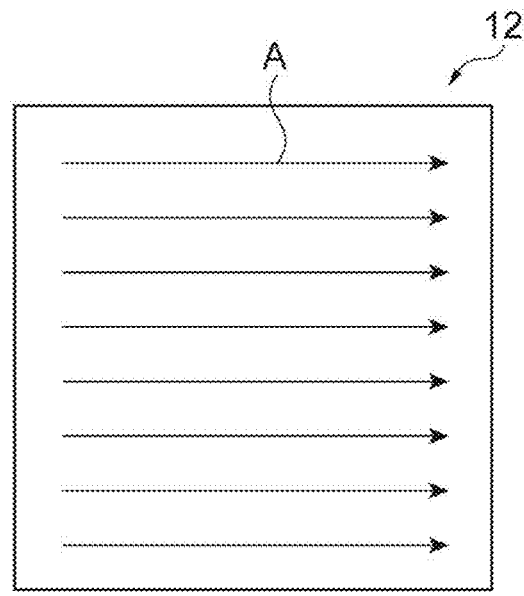
FIGS. 8A and 8B are schematic diagrams for explaining an example process of forming an identification code.

Next, as illustrated in FIG. 8A, the base region 12 is formed on the surface 2b of the stack 2 (the outer surface of the blanked member W forming the top layer or the bottom layer of the stack 2) by using the base laser beam. In this case, the base region 12 is formed by repeatedly scanning with the base laser beam along a predetermined direction A over multiple rows. The entire region where the identification code 10 is to be formed may be irradiated with the base laser beam. That is, even the cells 16 in which the black marking 14 is to be formed may be irradiated with the base laser beam.

Figure 8B:
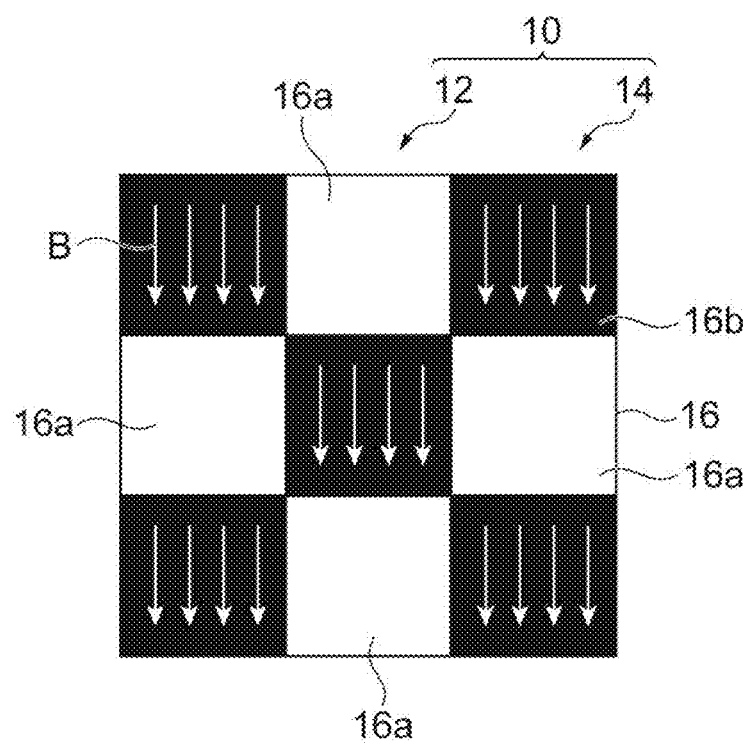

Next, as illustrated in FIG. 8B, the cells 16 to serve as the black cells 16b are specified from among a plurality of cells 16, in accordance with the identification code 10 to be formed. Next, the black marking 14 is formed on the base region 12 using the marking laser beam. The black marking 14 is formed by repeatedly scanning with the marking laser beam along a predetermined direction B different from the direction A over multiple rows.

In forming the black marking 14, when parameters a, b, and n are defined as:

a: the length of one side of each cell 16;
b: the pulse diameter of the marking laser beam; and
n: a number of scans of the marking laser beam per cell 16 the specified cells 16 may be irradiated with the marking laser beam such that Expression 2 is satisfied.

$$b \times n/a \geq 0.5 \quad (2)$$

Expression 2 is satisfied when the irradiated area with the marking laser beam a×b×n relative to the area $a^2$ of the cell 16 (a×b×n/$a^2$) is equal to or greater than 0.5. Thus, when Expression 2 is satisfied, the filling ratio of each black cell 16b is equal to or greater than 50% (see FIG. 6B as an example of the filling ratio of approximately 57%). Since the filling ratio of each black cell 16b is relatively large, the contrast between the black marking 14 and the base region 12 is even more improved. Accordingly, the readability of the identification code 10 can be even more enhanced.

In forming the black marking 14, the specified cells 16 may be irradiated with the marking laser beam such that the parameters a, b, and n satisfy Expression 3, Expression 4, or Expression 5.

$$b \times n/a \geq 1 \quad (3)$$

$$b \times n/a \geq 2 \quad (4)$$

$$b \times n/a \geq 3 \quad (5)$$

When Expression 3 is satisfied, the filling ratio of each black cell 16b is equal to or greater than 100% (see FIG. 6A as an example of the filling ratio of about 100%). When Expression 4 is satisfied, the filling ratio of each black cell 16b is equal to or greater than 200%. When Expression 5 is satisfied, the filling ratio of each black cell 16b is equal to or greater than 300% (see FIG. 6C as an example of the filling ratio of about 300%). In these cases, since the filling ratio of each black cell 16b is sufficiently large, the contrast between the black marking 14 and the base region 12 is significantly improved. Accordingly, the readability of the identification code 10 can be significantly enhanced.

The length a is determined, for example, based on the size of the identification code 10 (base region 12) and the data capacity of the identification code 10. The pulse diameter b is determined, for example, based on the output level of the marking laser beam and the material of the irradiation target (stack 2).

The stacked rotor core 1 is finished when the identification code 10 is formed on the surface 2b of the stack 2 through the steps described above.

Method of Reading Identification Code

Figure 9:
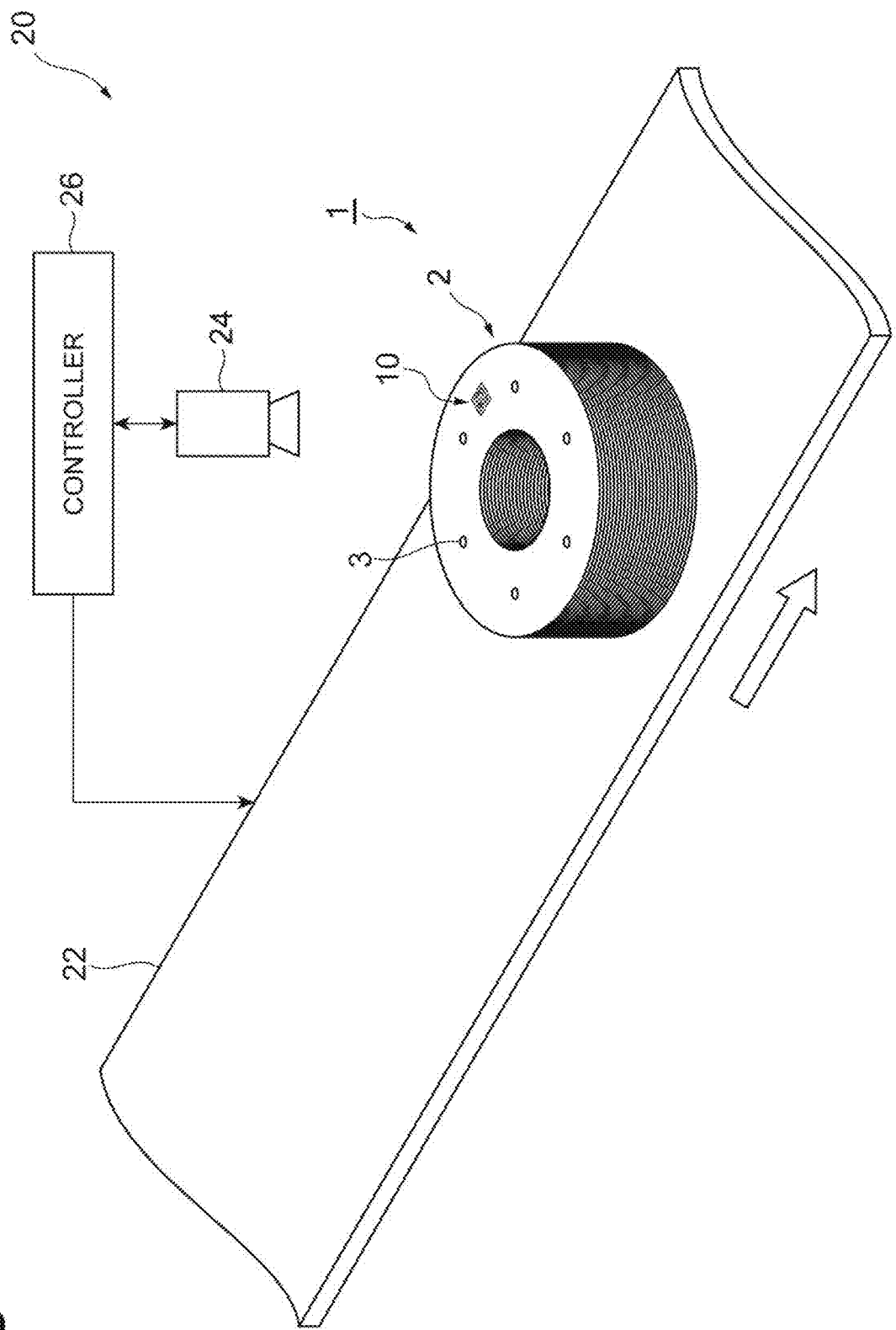
FIG. 9 is a diagram for explaining a method of reading the identification code.

A method of reading the identification code 10 will now be described. The identification code 10 is read, for example, by using a reader 20 illustrated in FIG. 9. The reader 20 includes a transportation conveyor 22, a camera 24 for reading, and a controller 26.

The transportation conveyor 22 operates based on an instruction from the controller 26 and is configured to transport the stacked rotor core 1 placed thereon in a predetermined direction. The camera 24 is positioned above the transportation conveyor 22. The camera 24 operates based on an instruction from the controller 26 and captures an image of the identification code 10 when the stacked rotor core 1 transported by the transportation conveyor 22 passes through below the camera 24. The controller 26 processes the captured image data captured by the camera 24 and reads the identification code 10. When it is determined that the identification code 10 fails to be read, the controller 26 allows the camera 24 to repeatedly capture an image of the identification code 10 as long as the stacked rotor core 1 is present within the imaging range of the camera 24.

Here, a test was conducted in which square cells 16 were irradiated with the marking laser beam, which was a pulsed laser with a spot diameter of 30 μm, to form the black marking 14 in the base region 12, the resultant identification code 10 was read by the camera 24 from a predetermined direction (not from immediately above), and the reading success rate was determined with different sizes of the cell 16 and different numbers of scans. In the present description, "reading success rate" refers to the rate at which the reading by the camera 24 is successful when the identification code 10 is read 50 times by the camera 24.

Figure 10A:
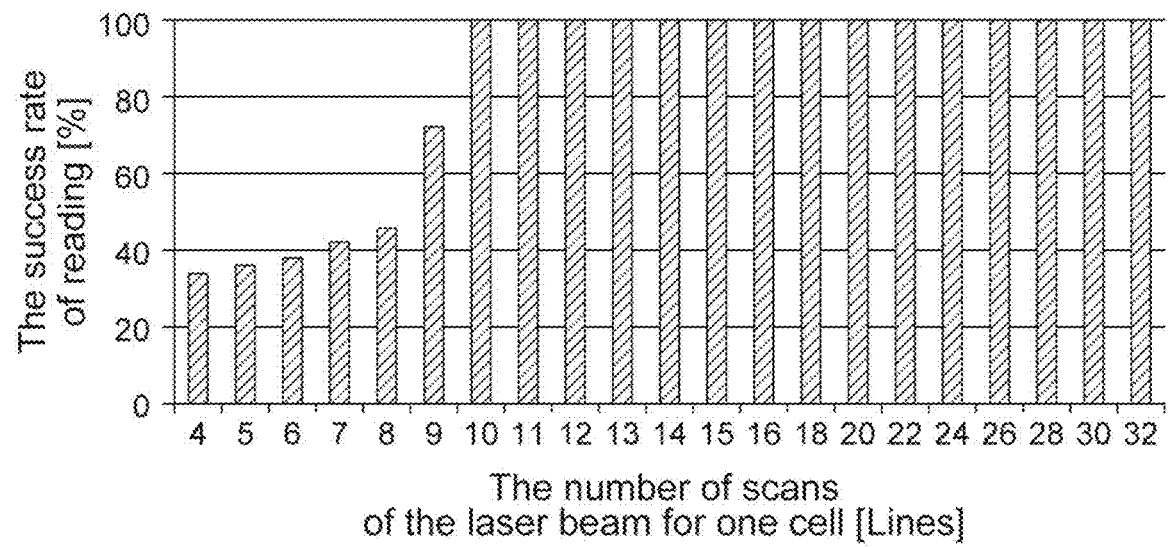
FIG. 10A is a graph illustrating the relation between the number of scans of a marking laser beam for one cell of a 0.15 mm square and the success rate of reading the identification code formed with the corresponding number of scans.

FIG. 10A illustrates the result when one side of the cell 16 was 0.15 mm, and the number of scans of the marking laser beam was changed from 4 to 32 (for 16 or more scans, only even number of scans). When the number of scans was four (the filling ratio was 80%), the reading success rate was 35%. When the number of scans was five (the filling ratio was 100%), the reading success rate was 37%. When the number of scans was six (the filling ratio was 120%), the reading success rate was 39%. When the number of scans was seven (the filling ratio was 140%), the reading success rate was 42%. When the number of scans was eight (the filling ratio was 160%), the reading success rate was 45%. When the number of scans was nine (the filling ratio was 180%), the reading success rate was 72%. When the number of scans was ten or more (the filling ratio was 200% or more), the reading success rate was 100%.

Figure 10B:
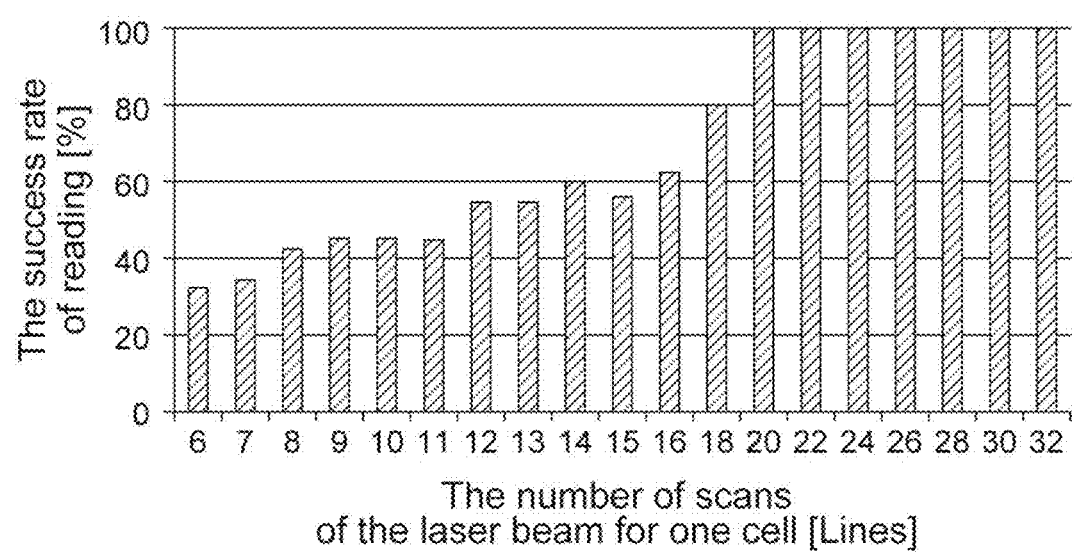
FIG. 10B is a graph illustrating the relation between the number of scans of a marking laser beam for one cell of a 0.285 mm square and the success rate of reading the identification code formed with the corresponding number of scans.

FIG. 10B illustrates the result when one side of the cell 16 was 0.285 mm, and the number of scans of the marking laser beam was changed from 6 to 32 (for 16 or more scans, only even number of scans). When the number of scans was six (the filling ratio was 63%), the reading success rate was 33%. When the number of scans was seven (the filling ratio was 73.7%), the reading success rate was 35%. When the number of scans was eight (the filling ratio was 84.2%), the reading success rate was 42%. When the number of scans was nine (the filling ratio was 94.7%), the reading success rate was 44%. When the number of scans was 10 (the filling ratio was 105.3%), the reading success rate was 44%. When the number of scans was eleven (the filling ratio was 115.8%), the reading success rate was 43%. When the number of scans was twelve (the filling ratio was 126.3%), the reading success rate was 56%. When the number of scans was thirteen (the filling ratio was 136.8%), the reading success rate was 56%. When the number of scans was fourteen (the filling ratio was 147.4%), the reading success rate was 60%. When the number of scans was fifteen (the filling ratio was 157.9%), the reading success rate was 57%. When the number of scans was sixteen (the filling ratio was 168.4%), the reading success rate was 62%. When the number of scans was eighteen (the filling ratio was 189.4%), the reading success rate was 80%. When the number of scans was twelve or more (the filling ratio was 210.5% or more), the reading success rate was 100%.

The test results above confirmed that when the filling ratio was 50% or more, the reading of the identification code 10 is successful at least 30%.

In some examples, the base region 12 is firstly formed on the surface 2b of the stack 2 and thereafter the black marking 14 is formed in the base region 12. The stacked rotor core 1 is thus obtained in which the identification code 10 comprising a combination of the black marking 14 and the base region 12 is formed on the surface 2b of the stack 2. The black marking 14 is therefore present in the base region 12 on the even surface 2b. Accordingly, the contrast between the black marking 14 and the base region 12 is improved. As a result, the readability of the identification code 10 can be enhanced.

In some examples, the base region 12 is formed by repeatedly scanning with the base laser beam along the direction A over multiple rows, and the black marking 14 is formed by repeatedly scanning with the marking laser beam along the direction B different from the direction A over multiple rows. That is, the laser grooves that form the base region 12 extend in the same direction A in any rows. With this configuration, any incident light on the base region 12 is likely to be reflected approximately in the same direction. Similarly, the laser grooves that form the black marking 14 extend in the same direction B in any rows. With this configuration, any incident light on the black marking 14 is likely to be reflected approximately in the same direction. Accordingly, the contrast between the black marking 14 and the base region 12 is more improved. As a result, the readability of the identification code 10 can be more enhanced.

Figure 11:
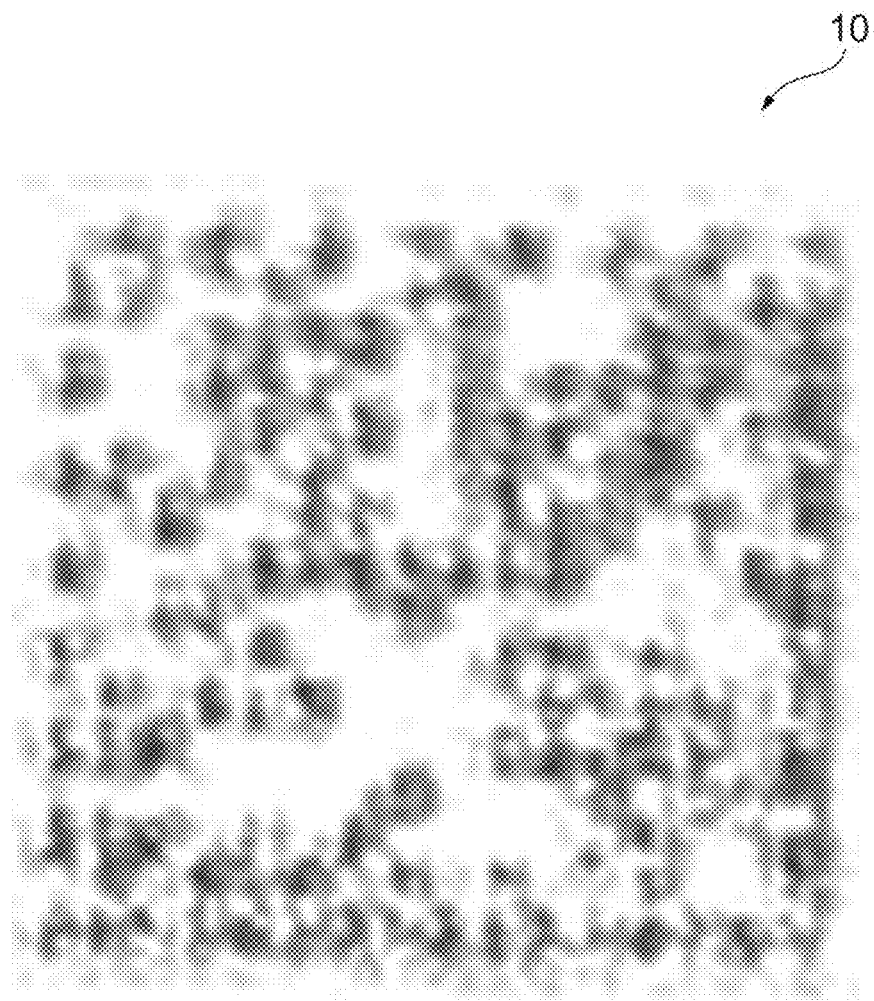
FIG. 11 is a diagram illustrating an example captured image of the identification code by a camera.

In some examples, the direction B which is the scan direction of the marking laser beam intersects (is orthogonal to) the direction A which is the scan direction of the base laser beam. In this configuration, the direction of reflected light from the base region 12 and the direction of reflected light from the black marking 14 are different directions. Accordingly, the contrast between the black marking 14 and the base region 12 is further improved. As a result, the readability of the identification code 10 can be further enhanced. When the direction B which is the scan direction of the marking laser beam is the same as the direction A which is the scan direction of the base laser beam, as illustrated in FIG. 11, the contrast is reduced and the captured image of the identification code 10 may be unclear.

In some examples, the contrast between the black marking 14 and the surrounding is enhanced, so that an image of the identification code 10 can be captured by the camera 24 not only from the position facing the identification code 10 but also from the diagonal direction. Specifically, since the stacked rotor core 1 has its form changed, for example, due to insertion of a shaft into the through hole 2a in the subsequent step, the imaging direction of the identification code 10 by the camera 24 tends to be limited. However, in some examples, it is possible to read the identification code 10 from various directions.

It is to be understood that not all aspects, advantages and features described herein may necessarily be achieved by, or included in, any one particular example embodiment. Indeed, having described and illustrated various examples herein, it should be apparent that other examples may be modified in arrangement and detail may be omitted.

In some examples, the identification code 10 may comprise a combination of the base region 12 and the black marking 14. That is, the black marking 14 may be formed on the base region 12. Alternatively, the base region 12 and the black marking 14 may be formed so as not to overlap each other. However, overlapping of the base region 12 and the black marking 14 to some extent due to radiation tolerance of the base laser beam and the marking laser beam is acceptable.

Figure 12A:
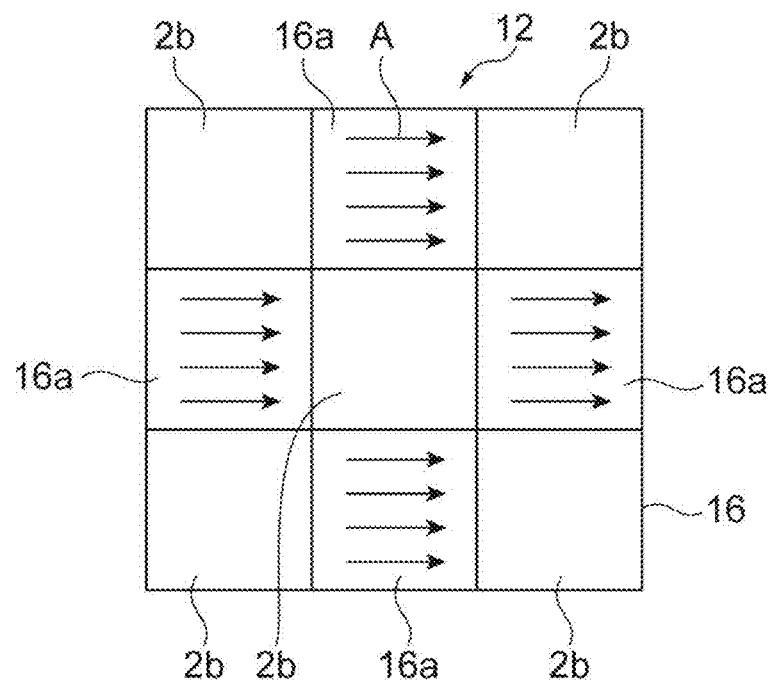
FIGS. 12A and 12B are schematic diagrams for explaining another example process of forming an identification code.
Figure 12B:
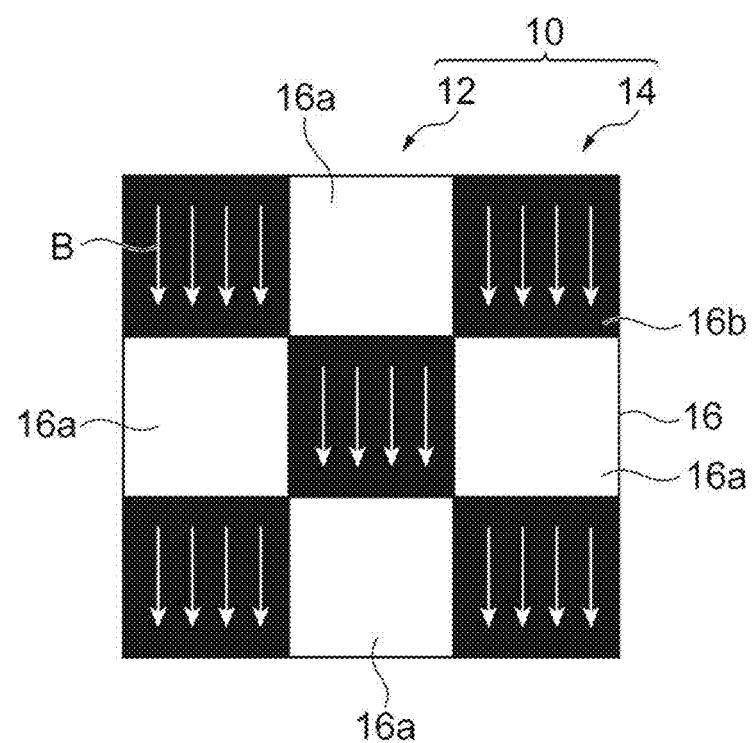

For example, as illustrated in FIG. 12A, only white cells 16a are first obtained by repeatedly scanning along the direction A while irradiating only the cells 16 in which the base region 12 is to be formed in the identification code 10 with the base laser beam over multiple rows. As illustrated in FIG. 12B, only black cells 16b are then obtained by repeatedly scanning along the direction B while irradiating only the cells 16 in which the black marking 14 is to be formed in the identification code 10 with the marking laser beam over multiple rows. With this process, the base region 12 and the black marking 14 are individually formed with almost no overlap with each other.

Figure 13A:
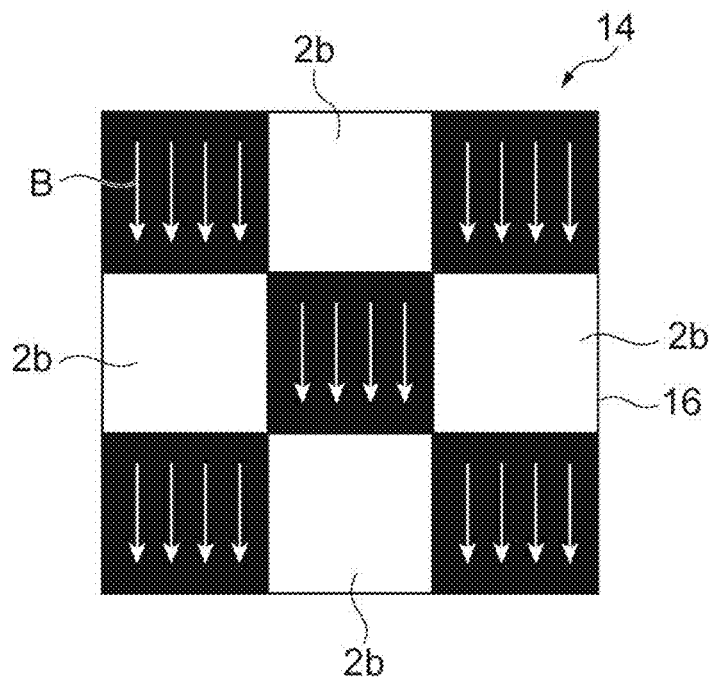
FIGS. 13A and 13B are schematic diagrams for explaining another example process of forming an identification code.
Figure 13B:
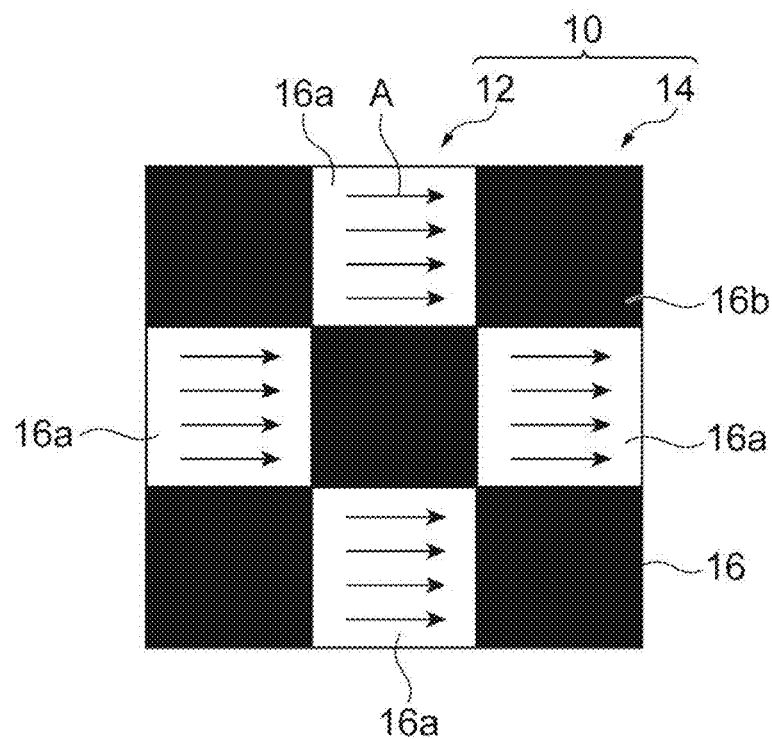

For example, as illustrated in FIG. 13A, only black cells 16b are first obtained by repeatedly scanning along the direction B while irradiating only the cells 16 in which the black marking 14 is to be formed in the identification code 10 with the marking laser beam over multiple rows. As illustrated in FIG. 13B, only white cells 16a are then obtained by repeatedly scanning along the direction A while irradiating only the cells 16 in which the base region 12 is to be formed in the identification code 10 with the base laser beam over multiple rows. With this process, the base region 12 and the black marking 14 are individually formed with almost no overlap with each other.

In some examples, the direction B which is the scan direction of the marking laser beam may not intersect the direction A which is the scan direction of the base laser beam. For example, the direction B may be approximately the same direction as the direction A or may be approximately the opposite direction.

Figure 14A:
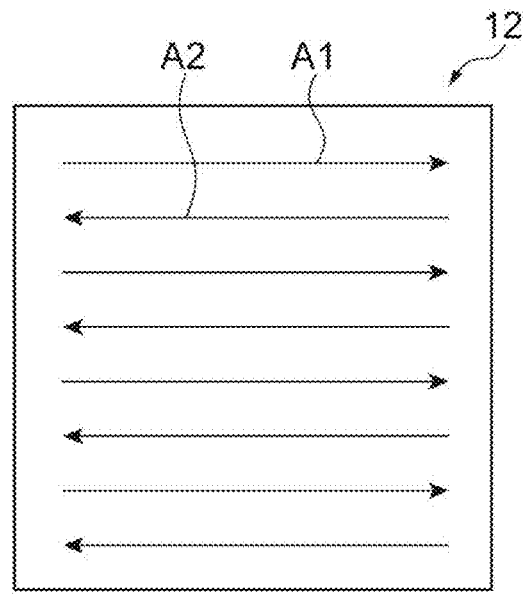
FIGS. 14A and 14B are schematic diagrams for explaining another example process of forming an identification code.
Figure 14B:
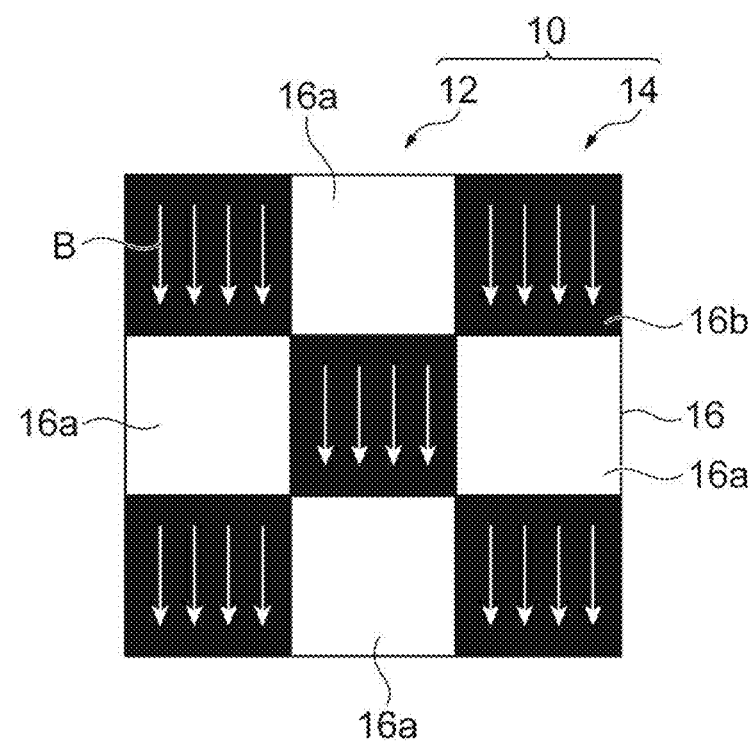
Figure 15A:
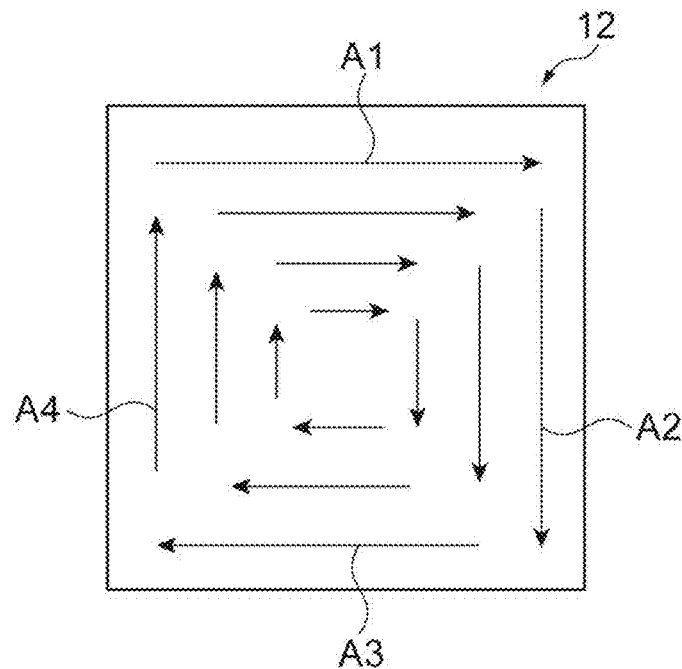
FIGS. 15A and 15B are schematic diagrams for explaining another example process of forming an identification code.
Figure 15B:
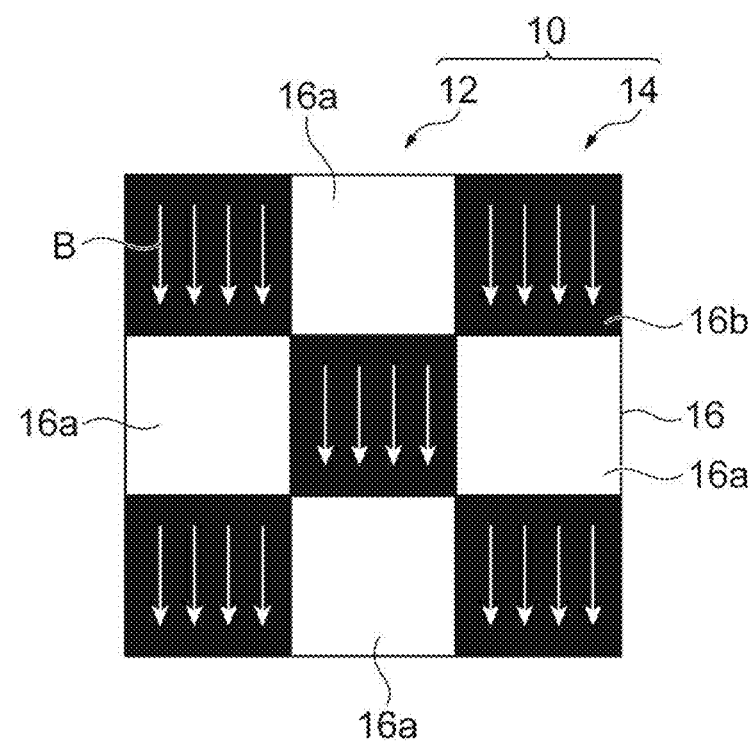

In some examples, the scan direction of the base laser beam in forming the base region 12 may not be necessarily the direction A and may be a variety of directions. For example, the scan direction of the base laser beam in forming the base region 12 may be meandering, may be opposite between the forward path and the return path (see FIG. 14A and FIG. 14B), or may be spiral (see FIG. 15A and FIG. 15B). When the scan direction of the base laser beam is opposite between the forward path and the return path, the base region 12 is formed by scanning with the base laser beam so as to reciprocate in a direction A1 and a direction A2 that is the opposite direction to the direction A1 (see FIG. 14A). Thereafter, the marking laser beam is scanned along the direction B different from the directions A1 and A2 to form the black marking 14 (see FIG. 14B). When the scan direction of the base laser beam is spiral, the base region 12 is formed by repeatedly scanning with the base laser beam along a direction A1, scanning with the base laser beam from the end point along a direction A2 orthogonal to the direction A1, scanning with the base laser beam from the end point along a direction A3 orthogonal to the direction A2, and scanning with the base laser beam from the end point along a direction A4 orthogonal to the direction A3 (see FIG. 15A). Thereafter, the marking laser beam is scanned along the direction B different from the directions A1 and A3 to form the black marking 14 (see FIG. 15B). Similarly, the scan direction of the marking laser beam in forming the black marking 14 may not be necessarily the direction B and may be a variety of directions. For example, the scan direction of the marking laser beam in forming the black marking 14 may be meandering, may be opposite between the forward path and the return path, or may be spiral.

In some examples, the arrangement pitch of laser grooves in the black cell 16b may be constant or may be irregular. That is, the interval between adjacent laser grooves may be a regular interval or may not be a regular interval. When the interval between adjacent laser grooves is not a regular interval, the laser grooves are allocated uniformly to some extent in the cell 16.

In some examples, the black marking 14 may be directly formed on the surface 2b of the stack 2 without forming the base region 12.

In some examples, as long as the reading success rate of the identification code 10 exceeds 0%, the filling ratio may be less than 50% in the black cells 16b.

In some examples, when a permanent magnet is provided in the stack 2, for example, a metal end plate made of stainless steel may be disposed on each of both end surfaces of the stack 2 in order to suppress demagnetization of the magnet, and the identification code 10 may be provided on the end plate. The metal end plate may undergo predetermined surface treatment, which may make the gloss of the surface of the end plate uneven or make the surface of the metal end plate into the mirror surface state. However, even in such a case, it is possible to enhance the contrast between the black marking 14 and the surrounding thereof and thereby enhance the readability of the identification code 10.

In some examples, when an image of the identification code 10 is captured by the camera 24, imaging conditions such as illumination may be changed as appropriate so as to capture a clear image of the identification code 10.

In some examples, the identification code 10 may comprise anything other than a combination of the white cells 16a and the black cells 16b. That is, the identification code 10 may comprise with a combination of other colors, in addition to or instead of white and black as long as the contrast is enhanced. For example, the identification code 10 may be a multilayered two-dimensional code (two-dimensional code formed by multilayering color information). An example of the multilayered two-dimensional code is PM code (registered trademark).

Figure 16A:
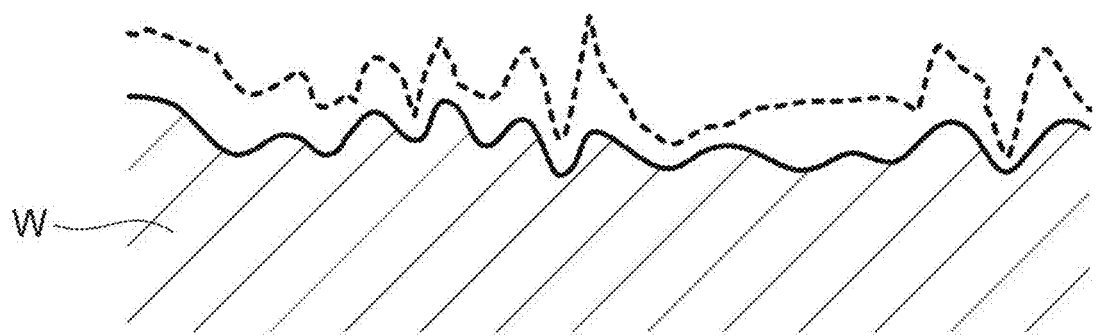
FIGS. 16A and 16B are schematic diagrams for explaining another example process of forming a base region.

In some examples, the base region 12 may be formed as follows. First of all, a predetermined region of the surface 2b of the stack 2 (the outer surface of the blanked member W forming the top layer or the bottom layer of the stack 2) is subjected to pretreatment (rough treatment) by using the base laser beam. For example, scanning along a predetermined direction A (see FIG. 8A) while irradiating the surface 2b with the base laser beam at a first output level is repeated over multiple rows. A preliminary region (not illustrated) is thus formed on the surface 2b. In the preliminary region, rolling marks on the surface Wa are roughly smoothed. For example, with the pretreatment, the protrusions and depressions with a height of approximately a few μm to a few tens of μm (see the broken line in FIG. 16A) due to rolling marks become protrusions and depressions with a height of approximately 5 or less (see the solid line in FIG. 16A).

Figure 16B:
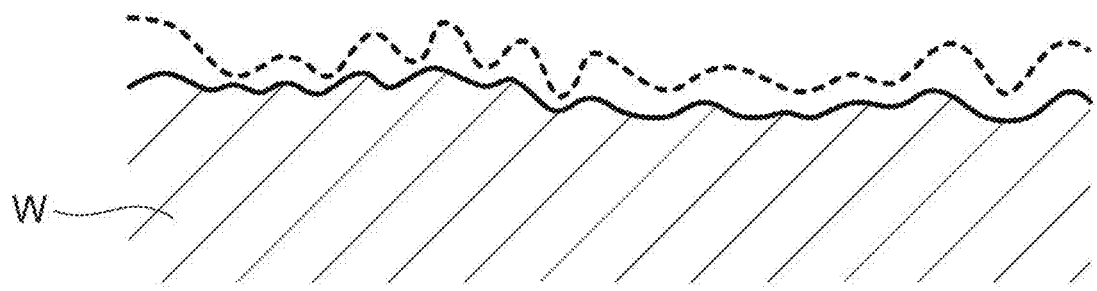

Next, the preliminary region is subjected to main treatment (finishing) by using the base laser beam. For example, scanning along a predetermined direction A (see FIG. 8A) while irradiating the preliminary region with the base laser beam at a second output level lower than the first output level is repeated over multiple rows. The second output level may be, for example, equal to or lower than half of the first output level, may be equal to or lower than one-third of the first output level, or may be equal to or lower than one-fourth of the first output level. The base region 12 is thus formed on the surface 2b. In the base region 12, the surface of the preliminary region is even more flattened. For example, with the main treatment, the protrusions and depressions with a height of approximately 5 μm or less in the preliminary region (see the broken line in FIG. 16B) become protrusions and depressions with a height of about 1 μm or less (see the solid line in FIG. 16B). The black marking 14 is formed in the thus formed base region 12, whereby the contrast between the black marking 14 and the base region 12 is even more improved. As a result, the readability of the identification code 10 can be significantly enhanced.

(11) The method stated above may be applied not only to the stacked rotor core 1 but also to a stacked stator core, or the method stated above may be applied to any other various metal products.

Additional Examples

An method of manufacturing a metal product may comprise forming a base region on a surface of a metal member by repeatedly scanning along a predetermined first direction while irradiating the surface of the metal member with a base laser beam over a first set of rows. The method may further comprise forming a marking by repeatedly scanning along a predetermined second direction while irradiating the surface of the metal member with a marking laser beam over a second set of rows. Further, the second direction may be different from the first direction. Still further, an identification code having a predetermined pattern may comprise a combination of the base region and the marking.

The method may comprise forming the base region on the surface of the metal member and forming the marking on the surface of the metal member. With this process, the metal product is obtained in which the identification code comprising the combination of the marking and the base region is formed on the surface of the metal member. Thus, the marking is present in a region surrounded by the base region with an even surface. Accordingly, the contrast between the marking and the base region is improved. As a result, the readability of the identification code can be enhanced.

The method may comprise forming the base region by repeatedly scanning with the base laser beam along the first direction over the first set of rows, and forming the marking by repeatedly scanning with the marking laser beam along the second direction over the second set of rows. That is, the laser grooves that form the base region extend in the same first direction in any rows. With this configuration, any incident light on the base region is likely to be reflected approximately in the same direction. Similarly, the laser grooves that form the marking extend in the same second direction in any rows. With this configuration, any incident light on the marking is likely to be reflected approximately in the same direction. Accordingly, the contrast between the marking and the base region is more improved. As a result, the readability of the identification code can be more enhanced.

The second direction which is the scan direction of the marking laser beam may be a direction different from the first direction which is the scan direction of the base laser beam. With this configuration, the direction of reflected light from the base region and the direction of reflected light from the marking are different directions. Accordingly, the contrast between the marking and the base region is further improved. As a result, the readability of the identification code can be further enhanced.

In some examples, forming the marking may include forming the marking by irradiating the base region with the marking laser beam.

In some examples, the base region and the marking may be formed in regions that do not overlap each other.

In some examples, the second direction may intersect the first direction. In this case, the contrast between the marking and the base region is even more improved. As a result, the readability of the identification code can be even more enhanced.

In some examples, the base laser beam and the marking laser beam may comprise pulsed laser light, the base laser beam may be scanned at a feed pitch equal to or smaller than a spot diameter in the first direction and at an arrangement pitch equal to or smaller than a spot diameter in a direction perpendicular to the first direction, and the marking laser beam may be scanned at a feed pitch equal to or smaller than a spot diameter in the second direction and at a predetermined arrangement pitch in a direction perpendicular to the second direction.

In some examples, the marking may comprise a combination of cells each having a square shape, and forming the marking may include irradiating each of the cells with the marking laser beam such that Expression 6 is satisfied:

$$b \times n/a \geq 0.5 \quad (6)$$

where the parameters a, b, and n are defined as:
- a: a length of one side of each cell;
- b: a pulse diameter of the marking laser beam; and
- n: a number of scans of the marking laser beam per cell.

In this case, the proportion of the total irradiated area with the second laser beam relative to the area of one cell that forms the marking, that is, the filling ratio by the second laser beam for one cell (which hereinafter may be simply referred to as "filling ratio") is equal to or greater than 50%. Thus, since the filling ratio of each cell is relatively large, the contrast between the marking and the base region is even more improved. As a result, the readability of the identification code can be even more enhanced.

In some examples, forming the marking may include irradiating each of the cells with the marking laser beam such that Expression 7 is satisfied.

$$b \times n/a \geq 1 \quad (7)$$

In this case, the filling ratio is equal to or higher than 100%. Thus, since the filling ratio of each cell is sufficiently large, the contrast between the marking and the base region is significantly improved. As a result, the readability of the identification code can be significantly enhanced.

In some examples, the marking may comprise a black marking formed by oxidizing the surface of the metal member by the marking laser beam.

In some examples, forming the base region may include repeatedly scanning along the first direction while irradiating the surface of the metal member with the base laser beam at a first output level, and repeatedly scanning along the first direction while irradiating a region of the metal member with the base laser beam at a second output level lower than the first output level, the region being irradiated with the base laser beam at the first output level. In this case, in forming the base region, laser with a high output level is firstly emitted. With this process, rolling marks on the surface of the metal member are roughly smoothed (rough treatment). Thereafter, the region irradiated with laser with a high output level is irradiated with laser with a low output level. With this process, the protrusions and depressions of the roughly smoothed surface of the metal member are even more flattened (finishing). The marking is formed in the thus formed base region, whereby the contrast between the marking and the base region is even more improved. As a result, the readability of the identification code can be significantly enhanced.

Another example method of manufacturing a metal product may comprise forming a marking by repeatedly scanning along a predetermined first direction while irradiating a surface of a metal member with a marking laser beam over a first set of rows, the marking laser beam generated by a pulse-like laser light source. The marking laser beam may be scanned at a feed pitch equal to or smaller than a spot diameter in the first direction and at a predetermined arrangement pitch in a row direction. Further, the marking may comprise a combination of cells each having a square shape. Still further, forming the marking may include irradiating each of the cells with the marking laser beam such that Expression 8 is satisfied:

$$b \times n/a \geq 0.5 \quad (8)$$

where parameters a, b, and n are defined as:
- a: a length of one side of each cell;
- b: a pulse diameter of the marking laser beam; and
- n: a number of scans of the marking laser beam per cell.

In some examples, each cell is irradiated with the marking laser beam such that Expression 8 is satisfied. In this configuration, the filling ratio is equal to or greater than 50%. Accordingly, since the filling ratio of each cell is relatively large, the contrast between the marking and the surrounding region is even more improved. As a result, the readability of the identification code can be even more enhanced.

In some examples, forming the marking may include irradiating each of the cells with the marking laser beam such that Expression 9 is satisfied.

$$b \times n/a \geq 1 \quad (9)$$

In this case, the similar effects as in Example 5 can be achieved.

The method may further include, before forming the marking, forming a base region on the surface of the metal member by repeatedly scanning along a predetermined second direction while irradiating the surface of the metal member with a base laser beam over a second set of rows. An identification code having a predetermined pattern may comprise a combination of the base region and the marking. Forming the marking may include irradiating the base region with the marking laser beam.

The method may further include forming a base region on the surface of the metal member by repeatedly scanning along a predetermined second direction while irradiating the surface of the metal member with a base laser beam over a second set of rows. An identification code having a predetermined pattern may comprise a combination of the base region and the marking. The base region and the marking may be formed in regions that do not overlap each other.

In some examples, the first direction may intersect the second direction.

In some examples, the base laser beam may comprise pulse-like laser light and is scanned at a feed pitch equal to or smaller than a spot diameter in the second direction and at an arrangement pitch equal to or smaller than a spot diameter in a row direction.

In some examples, forming the base region may include repeatedly scanning along the first direction while irradiating the surface of the metal member with the base laser beam at a first output level, and repeatedly scanning along the first direction while irradiating a region of the metal member with the base laser beam at a second output level lower than the first output level, the region being irradiated with the base laser beam at the first output level.

In some examples, the marking may comprise a black marking formed by oxidizing the surface of the metal member by the marking laser beam.

An example metal product may comprise an identification code having a predetermined pattern comprising a combination of a base region and a marking formed on a surface of a metal member. The base region may comprise multiple rows of configured such that laser grooves extending in a predetermined first direction. Further, the marking may comprise multiple rows of configured such that laser grooves extending in a predetermined second direction different from the first direction.

In some examples, the second direction may intersect the first direction.

In some examples, the base region may comprise pulse marks that are arranged at a feed pitch equal to or smaller than a spot diameter in the first direction and pulse marks that are arranged at an arrangement pitch equal to or smaller than a spot diameter in a direction perpendicular to the first direction. The marking may comprise pulse marks that are arranged at a feed pitch equal to or smaller than a spot diameter in the second direction and pulse marks that are arranged at a predetermined arrangement pitch in a direction perpendicular to the second direction.

In some examples, the marking may comprise a black marking formed by oxidizing the surface of the metal member.

We claim all modifications and variations coming within the spirit and scope of the subject matter claimed herein.

The invention claimed is:

1. A method of manufacturing a metal product, the method comprising:
    forming a marking by repeatedly scanning along a predetermined first direction while irradiating a surface of a metal member with a marking laser beam over a first set of rows, the marking laser beam generated by a pulse-like laser light source,
    wherein the marking laser beam is scanned at a feed pitch equal to or smaller than a spot diameter in the first direction and at a predetermined arrangement pitch in a row direction,
    wherein the marking comprises a combination of cells each having a square shape, and
    wherein forming the marking includes irradiating each of the cells with the marking laser beam such that:

$b \times n/a \geq 0.5$ where parameters a, b, and n are defined as:
        a: a length of one side of each cell;
        b: a pulse diameter of the marking laser beam; and
        n: a number of scans of the marking laser beam per cell,
    further comprising:
    before forming the marking, forming a base region on the surface of the metal member by repeatedly scanning along a predetermined second direction while irradiating the surface of the metal member with a base laser beam over a second set of rows,
    wherein an identification code having a predetermined pattern comprises a combination of the base region and the marking, and
    wherein forming the marking includes irradiating the base region with the marking laser beam.

2. The method according to claim 1, wherein forming the marking includes irradiating each of the cells with the marking laser beam such that:

$b \times n/a \geq 1$.

3. A method of manufacturing a metal product, the method comprising:
    forming a marking by repeatedly scanning along a predetermined first direction while irradiating a surface of a metal member with a marking laser beam over a first set of rows, the marking laser beam generated by a pulse-like laser light source,
    wherein the marking laser beam is scanned at a feed pitch equal to or smaller than a spot diameter in the first direction and at a predetermined arrangement pitch in a row direction,
    wherein the marking comprises a combination of cells each having a square shape, and
    wherein forming the marking includes irradiating each of the cells with the marking laser beam such that:

$b \times n/a \geq 0.5$ where parameters a, b, and n are defined as:
        a: a length of one side of each cell;
        b: a pulse diameter of the marking laser beam; and
        n: a number of scans of the marking laser beam per cell,
    further comprising:
    forming a base region on the surface of the metal member by repeatedly scanning along a predetermined second direction while irradiating the surface of the metal member with a base laser beam over a second set of rows,
    wherein an identification code having a predetermined pattern comprises a combination of the base region and the marking, and
    wherein the base region and the marking are formed in regions that do not overlap each other.

4. The method according to claim 1, wherein the first direction intersects the second direction.

5. The method according to claim 1, wherein the base laser beam comprises pulse-like laser light and is scanned at a feed pitch equal to or smaller than a spot diameter in the second direction and at an arrangement pitch equal to or smaller than a spot diameter in a row direction.

6. The method according to claim 1, wherein forming the base region includes
    repeatedly scanning along the first direction while irradiating the surface of the metal member with the base laser beam at a first output level, and
    repeatedly scanning along the first direction while irradiating a region of the metal member with the base laser beam at a second output level lower than the first output level, the region being irradiated with the base laser beam at the first output level.

7. The method according to claim 3, wherein forming the marking includes irradiating each of the cells with the marking laser beam such that:

$b \times n/a \geq 1$.

8. The method according to claim 3, wherein the first direction intersects the second direction.

9. The method according to claim 3, wherein the base laser beam comprises pulse-like laser light and is scanned at a feed pitch equal to or smaller than a spot diameter in the second direction and at an arrangement pitch equal to or smaller than a spot diameter in a row direction.

10. The method according to claim 3, wherein forming the base region includes
    repeatedly scanning along the first direction while irradiating the surface of the metal member with the base laser beam at a first output level, and
    repeatedly scanning along the first direction while irradiating a region of the metal member with the base laser beam at a second output level lower than the first output level, the region being irradiated with the base laser beam at the first output level.

* * * * *